April 25, 1933.　　　G. E. LUCE　　　1,905,477
BRICK EDGING MACHINE
Filed Oct. 19, 1929　　2 Sheets-Sheet 1
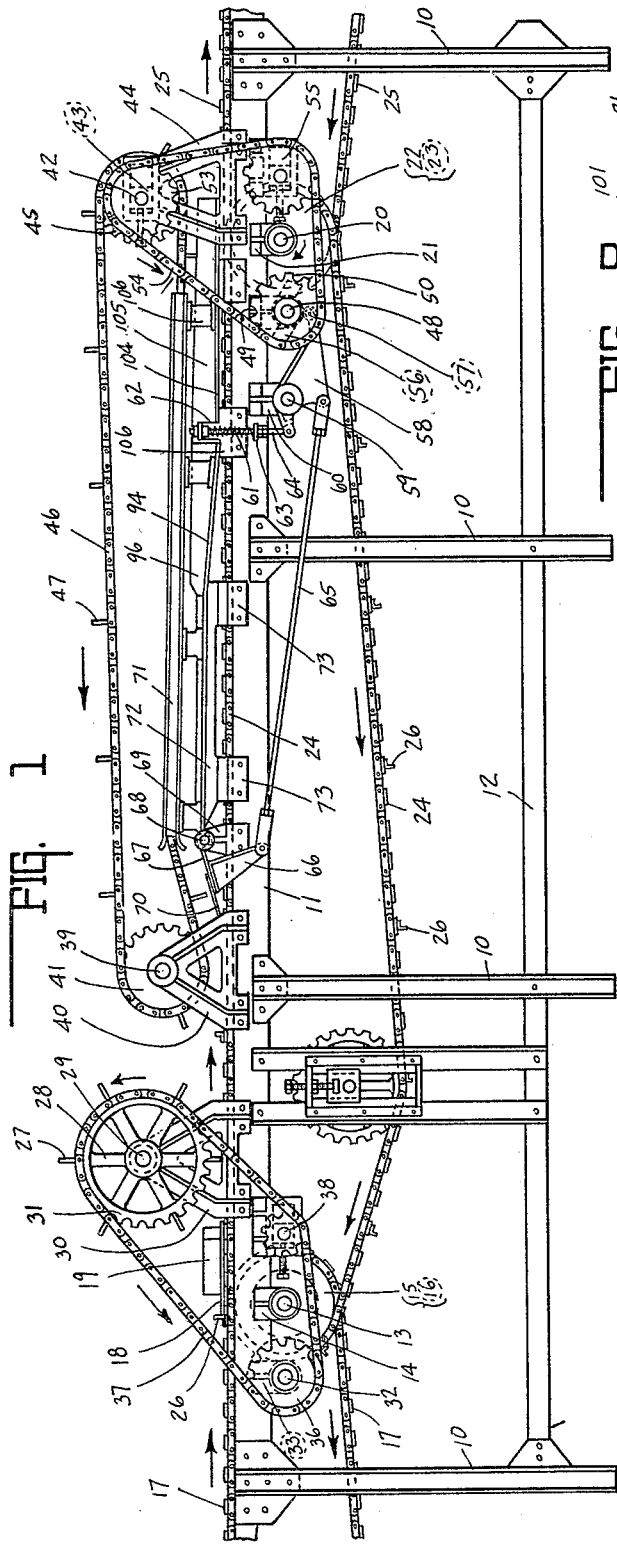
INVENTOR.
GRAFTON E. LUCE.
BY Lockwood Lockwood Goldsmith & Galt
ATTORNEYS.

April 25, 1933.    G. E. LUCE    1,905,477
BRICK EDGING MACHINE
Filed Oct. 19, 1929    2 Sheets-Sheet 2
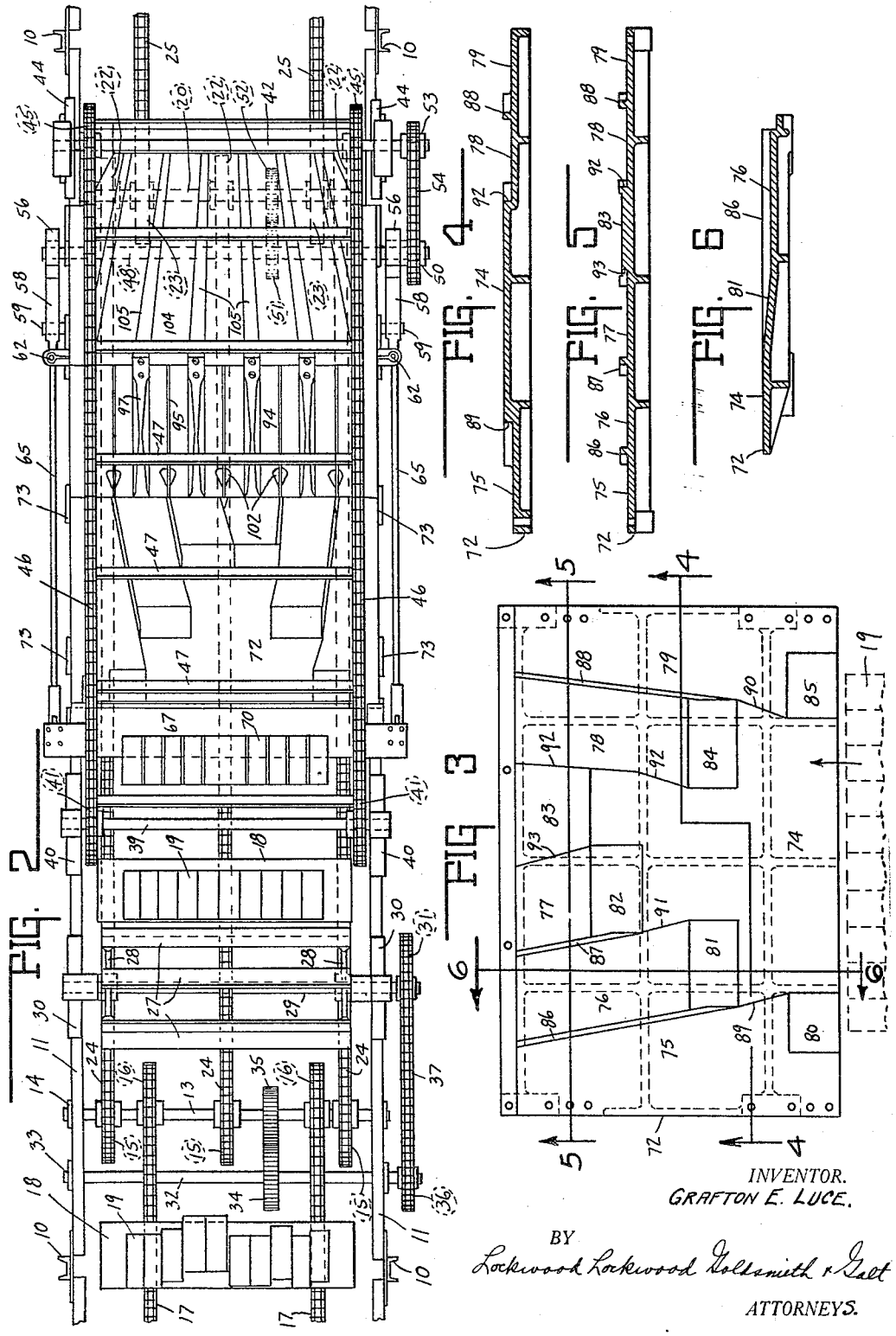
INVENTOR.
GRAFTON E. LUCE.
BY
Lockwood Lockwood Goldsmith & Galt
ATTORNEYS.

Patented Apr. 25, 1933

1,905,477

UNITED STATES PATENT OFFICE

GRAFTON E. LUCE, OF CHICAGO, ILLINOIS, ASSIGNOR TO LANCASTER IRON WORKS, INC., OF LANCASTER, PENNSYLVANIA, A CORPORATION

BRICK EDGING MACHINE

Application filed October 19, 1929. Serial No. 400,835.

This invention relates to a machine adapted to receive a plurality of rectangular articles such as brick and to turn them on edge, group them as desired and discharge them in the edged and grouped relation. The invention forms a continuation in part of that disclosed in copending application Serial No. 237,191, filed December 2, 1927, which application has resulted in Patent No. 1,746,664, issued February 11, 1930.

In the manufacture of brick by the so-called soft mud process, the brick are formed in a mold and placed in the soft condition on steel pallets with their largest surface in contact with the pallet. The brick are then dried without being removed from the pallet. In the mechanical handling of brick between the drier and the kiln, the pallets carrying the brick are transported from the drier by a chain conveyor. The pallets are accurately positioned upon the conveyor and the brick accurately centered upon the pallets by means of a centering device which is the subject of copending application of Grafton E. Luce and Thomas B. Huestis, Serial No. 365,743, filed May 24, 1929. The pallets and brick are then conveyed to an edging machine of the general type hereinafter disclosed, by means of which the brick on the pallet are turned up on edge and grouped in the proper relation for further handling. From the edging machine the brick are conveyed to a hacking machine of the general type disclosed in Patent No. 1,627,656, issued to Grafton E. Luce, May 10, 1927. The hacking machine removes the brick from the pallet and stacks them in a unit stack on a kiln car in the proper relation for burning. The car and brick are then transported to the kiln shed and the brick are set in place for burning by means of a brick setter of the general type disclosed in Patent No. 1,205,562, issued to R. C. Penfield November 21, 1916, and Patent No. 1,712,773, issued to Grafton E. Luce May 14, 1929.

The object of the present invention is to provide an edging machine which removes the brick from the pallet, turns them on edge and groups them in a desired relation with the minimum amount of damage to the brick and with a maximum capacity in brick per unit of time.

The specific features of the invention by which this object is attained will be apparent from the accompanying drawings and the following description and claims:

In the drawings Fig. 1 is a side elevation of the edging machine. Fig. 2 is a plan view thereof. Fig. 3 is a plan view of the separation table. Fig. 4 is a sectional view of the said table taken on the line 4—4 of Fig. 3. Fig. 5 is a similar view taken on the line 5—5 of Fig. 3. Fig. 6 is a similar view taken on the line 6—6 of Fig. 3. Fig. 7 is a perspective view of the edging channelways. Fig. 8 is an enlarged cross sectional view of two of the said channelways illustrating the position of the brick during the edging thereof.

A framework for supporting the machine is provided and includes a plurality of vertical columns 10, horizontal beams 11 supported upon the upper ends thereof, horizontal members 12 attached adjacent the lower ends of the said columns and suitable cross bracing between the columns 10 and between the members 11 not shown in the drawings. A horizontal shaft 13 is supported upon bearings 14 in turn supported upon the frame members 11 and carries three sprockets 15 and two sprockets 16. A pair of conveyor chains 17 are trained about the sprocket 16 and are adapted to deliver the pallets 18 carrying brick 19 to the edging machine. A shaft 20 is carried upon bearings 21 upon the frame members 11. The shaft 20 supports three sprockets 22 positioned opposite to the three sprockets 15 and also carries a pair of sprockets 23. Three conveyor chains 24 are trained about the sprockets 15 and the sprockets 22 and are adapted to receive the pallets from the conveyor chains 17 and to convey them through the edging machine. A pair of conveyor chains 25 are trained about the sprockets 23 and are adapted to receive the pallets from the conveyor chains 24 and to convey the same to the hacking machine. The conveyor chains 25 may be driven by any suitable means such as an electric motor. All of the sprockets 15, 16, 22 and 23 are keyed to their respective shafts. Therefore, the operation of conveyor chains 25 also drives conveyor chains 17 and 24.

Each of the outer pair of conveyor chains 24 carries a plurality of attachments 26 which project upwardly into the path of travel of the pallet. When discharged from the centering device which is the subject of the before-mentioned copending application, Serial No. 365,743, filed May 24, 1929, the pallets have been accurately centered upon the conveyor chains 17, and the brick have been centered upon the pallet and positioned with their edges in contact. The forward and rear edges of adjacent brick, however, have not been aligned with each other. The brick, therefore, may be in the relation illustrated in the left of Fig. 2. As described in the before-mentioned copending application, the pallets are released from the centering device in timed relation with the travel of the conveyor 17. This relation is such that the pallets reach the conveyor chains 24 at the proper time to position each pallet immediately ahead of a pair of the attachments 26.

For aligning the forward edges of the brick, an aligning wheel is provided consisting of horizontally disposed angle members 27 supported upon spiders 28 in turn fixedly carried upon a shaft 29. The shaft 29 is supported upon A-frames 30 carried upon the frame members 11. A sprocket 31 is carried upon one end of the shaft 29. A shaft 32 is supported upon bearings 33 carried upon the frame members 11 and is rotated by means of a pair of spur gears 34 and 35 carried upon the said shaft and upon the shaft 13 respectively. A sprocket 36 is carried upon the shaft 32 and a sprocket chain 37 is trained about the said sprocket and the sprocket 31. A take-up 38 is provided for taking up wear in the sprocket chains 37.

By means of this construction the aligning wheel is rotated in the direction indicated by an arrow in Fig. 1. The ratio of the gears 34 and 35 and the various sprocket sizes are selected to drive the outer edges of the horizontal members 27 of the aligning wheel at a speed slightly slower than the speed of the conveyor chain 24. Each of the members 27 is timed to reach its lowermost position at the proper time to engage the front edge of the brick carried upon a pallet. Since the members 27 are traveling at a slower speed than the chains 24, this engagement results in sliding the brick back on the pallet and sliding the pallet backward upon the chain until the pallet strikes the attachment 26. In the further travel of the pallet and the members 27 the said members are elevated from the path of the brick leaving the brick aligned upon the pallet with their rear edges substantially in line with the rear edges of the pallet and leaving the front edge of the pallet clear.

A shaft 39 is supported upon A-frames 40 carried upon frame members 11. A pair of sprockets 41 are supported upon the shaft 39. A shaft 42 is carried upon adjustable bearings 43 in A-frames 44 in turn supported upon the frame members 11. The shaft 42 carries sprockets 45. A pair of sprocket chains 46 of the roller type is trained about the sprockets 41 and 45. Horizontally-extending angle members 47 extend between the chains 46 and are attached thereto. A shaft 48 is supported upon bearings 49 upon the frame members 11 and carries at one end a sprocket 50. The shaft 48 is driven from the shaft 20 by a pair of spur gears 51 and 52. A sprocket 53 is carried upon the shaft 42 and a sprocket chain 54 is trained about the sprocket 50 and the sprocket 53. A take-up 55 is provided for adjusting the tension of the said chain. By this construction the chains 46 and the horizontal angle members 47 carried thereby are driven in the direction as illustrated by an arrow in Fig. 1 for a purpose to be hereinafter set forth.

A cam 56 is fixedly carried on each end of the shaft 48 and each cam is engaged by a roller 57 carried upon the outer end of an irregularly shaped member 58. The members 58 are pivotally carried upon a shaft 59 in turn supported by bearings 60 upon the frame members 11. The rollers 57 are normally maintained in contact with the cams 56 by means of compression springs 61, each bearing at one end upon a bracket 62 carried upon the frame member 11 and at the other end upon a seat 63 carried by a spring stem 64 in turn pivotally connected to one arm of the corresponding member 58. A link 65 is pivotally fastened to a portion of each member 58 and each link is pivotally fastened at its opposite end to a lever 66. The levers 66 are fastened to opposite ends of a transversely-extending plate 67. The plate 67 has attached thereto a shaft 68 supported in bearings 69 carried upon the frame members 11. The plate 67 carries a plurality of smaller plates 70 preferably of spring steel. In the operation of this portion of the apparatus the rotation of shaft 20 is transmitted by gears 51 and 52 to shaft 48. The rotation of shaft 48 causes the cams 56 to engage the rollers 57 thereby transmitting a rocking motion to the members 58. This motion is transmitted by means of links 65 and levers 66 to the plates 67 and 70. The said plates, therefore, will have a rocking motion about the shaft 68. This motion is so timed with the travel of the chains 24 that the plate 70 will be elevated during the approach of the pallet thereto and will be lowered at the proper time to place the edges of the plates 70 upon the clear front edge of the pallet. The travel of the chains 46 is so timed that one of the angle members 47 comes in contact with the rear edges of the brick upon the pallet at the same instant that the plates 70 reach their position upon the front edge of the pallet. Each of the chains 46 is provided with a guide 71 which carries the lower run of the chain approximately parallel with the plates 67 and 70. The members 47, therefore, propel the brick up the incline formed by plates 70 and 67 while the attachments 26 propel the pallet beneath the said plates.

When separated from their pallets the brick are arranged in a transverse row with their faces abutting each other. In this position it is extremely difficult to cause the brick to turn on edge since each brick interferes with its neighbor. The next step, therefore, is the separation of the transverse row of brick into groups of one or two brick which may then be easily turned on edge. For this purpose a separating plate 72 is provided having one edge adjacent the upper edge of the plate 67 and being supported by brackets 73 upon the frame members 11. The plate 72 is supported upon its outer edges only and, therefore, forms no obstruction to the passage of the empty pallet thereunder. The upper surface of the plate 72 carries a portion 74 which is substantially horizontal in extent and at the same level as the upper edge of the plate 67. At a slightly lower level are horizontal surfaces 75, 76, 77, 78 and 79. Sloping downward from the level of surface 74 are inclined surfaces 80, 81, 82, 83, 84 and 85. An up-standing rib 86 separates surfaces 75 and 76. A rib 87 separates surfaces 76 and 77 and a rib 88 separates surfaces 78 and 79.

It will be remembered that the pallet has been accurately positioned upon the conveyor and the brick have been accurately positioned upon the pallet by means of the centering device heretofore mentioned. The brick, therefore, approach the separating plate accurately positioned as illustrated in Fig. 3 and traveling in the direction of the arrow. The brick are propelled across the plate 72 by means of the members 47. The guides 71 insure that the lower edges of the members 47 will be positioned very close to the surface 74. The surfaces 75, 76, 77, 78 and 79 are below the surface 74 but not sufficiently so to allow the brick to be free of the members 47. The outer brick at one end of the row is propelled down the incline portion 80. The corner of this brick strikes a wall 89 which forms the boundary between surface 75 and the higher surface 74. The outer brick at the other end of the row is similarly propelled down the incline 85, and strikes a similar wall 90. These brick thereafter are propelled along the surfaces 75 and 79 guided by the walls 89 and 90 and the ribs 86 and 88. The remainder of the brick proceed over the surface 74.

The two outer brick at each end of the remaining row are similarly propelled down the inclined portions 81 and 84 respectively and are guided by wall 91 and rib 87 and by wall 92 along the surfaces 76 and 78 respectively. The remaining four brick continue to be propelled along the surface 74 and thereafter two of them descend the incline 82 and are guided by a wall 93 across the surface 77. The remaining pair descend the incline 83 to the same level that has been reached by the remainder of the brick. Thus the ten brick originally arranged with their edges abutting have now been separated into four groups of two brick each with a single separated brick in addition at each end of the row.

From the separating plate 72 the brick proceed to an edging plate 94. The edging plate 94 carries vertical partition members 95 forming a continuation of the ribs 86, 87 and 88 and the walls 92 and 93. Similar partition plates 96 are located near the edges of the plate 94. The partition plates 95 and 96, therefore, define channelways into which the separated groups of brick may pass. In the center of each of the channelways which are adapted to carry two brick, there is placed an edging bar 97. The outer channelways, each of which is adapted to carry but one brick, are fitted with edging bars 98. The edging bars 97 are shaped as shown particularly in Fig. 7, and include an inclined portion 99 rising from the level of the surfaces 76, 77 and 78. The inclined portion 99 is adapted to receive the abutting edges of each pair of brick. These edges are, therefore, elevated leaving the outer edges in contact with the surface of the plate 94. The partition plates 95 prevent the outer edges from sliding on the plate 94. The elevation of the abutting edges of the brick causes them to assume the position illustrated in Fig. 8. Further travel of the brick brings them into contact with substantially rectangular portions 100 of the edging bars which complete the edging operation by further turning the brick. To facilitate the edging, the edging bars are beveled as illustrated at 101 in Figs. 7 and 8. As shown, the bevel is greatest at approximately the mid-point of the inclined portion. The edging bars 98 provided for the outer channelways are of the same general form as the bars 97 but are only half the width and are provided with beveled portions 101 on one edge only.

It has been found in practice that sufficient space must be provided between the brick and partitions 95 to allow turning of the brick. If the brick enter the channelways in contact with the partitions 95, they tend to travel through without edging. In order to insure the required space, a member 102 is provided at each side of each of the partition members 95. The members 102 are roughly tetrahedral in form having the corners and the brickengaging surface somewhat rounded. The said members tend to throw the brick away from the partition members 95.

As illustrated in Fig. 1, the edging plate 94 may be positioned with a downward slope which brings the inclines 99 to a substantially horizontal position. When so positioned, the guideway 71 will be substantially straight, as illustrated in Fig. 1 so that the angle members 47 which propel the brick may follow a substantially straight line and still remain close to the surface of the edging bars. If desired, however, the plate 94 may be arranged substantially horizontally as illustrated in Fig. 7. In that case the guideway 71 will be formed with an upwardly inclined portion to insure that the angle members 47 closely follow the surface of the edging bars. The partition members 95 and 96 extend above the line of travel of the lower edges of the angle members 47. The said members 47 are, therefore, provided with a plurality of notches 103 positioned to register with the said partition members.

From the edging plate 94 the brick are discharged onto a grouping plate 104 provided with ribs 105, each forming a continuation of one of the edging bars. The ribs 105 may be shaped to guide the brick into any desired spaced relation. As illustrated herein, the ten brick here shown are preferably grouped in pairs.

The plates 72, 94 and 104 are supported upon abutments 73 and 106 carried upon the frame members 11. Since there is no other support for these plates, there is no obstruction to the passage of the pallet therebeneath. The speed of the conveyor chain 46 which propels the brick is maintained at substantially the same rate as the speed of the chains 24 carrying the pallet. The brick, therefore, reach the end of the grouping plate 104 at substantially the same time as the pallet from which they were removed. The brick are, therefore, discharged from the plate on to the pallet and the brick and pallet are thereafter conveyed to the hacking machine as heretofore described.

In the so-called soft mud process of brick manufacture, the molds are formed with a slight taper to facilitate dumping of the wet brick from the mold. The brick so formed are slightly tapered and, when edged, each brick tends to lean to right or left. If placed in the kiln with all brick leaning in the same direction, an unstable condition of the kiln is produced. It will be noticed that the apparatus herein described edges alternate brick in opposite directions. Furthermore, the brick are paired so that the two brick in a pair tend to lean toward each other, each acting as a support for the other. Throughout the hacking and setting operation the brick are maintained in this paired relation and a relatively stable kiln is, therefore, formed.

The foregoing description has been confined to the use of the invention for edging and grouping brick, however, it is evident that the invention is applicable to the edging and grouping of a large variety of other articles and is not intended to be limited by such description. In the following claims the term "brick" is intended to include any and all articles to which the invention is applicable.

For certain purposes it is not necessary or desirable that the brick, when edged, be returned to the pallet from which they have been removed. In such cases, the chain conveyor 25 may be replaced by a suitable belt conveyor or other device for the reception of the brick. The pallets may then be disposed of in any suitable manner after the removal of the brick therefrom.

The invention claimed is:

1. In combination, a conveyor adapted to movably support a pallet having brick thereon, a separator for removing the brick from the pallet, a platform having guide channels adapted to turn the brick on edge to group the same in a predetermined relation, a conveyor for moving the brick from the separator to the platform and for discharging the brick therefrom in the said predetermined relation, said first mentioned conveyor extending to a point adjacent the point of discharge of said brick from said platform, and mechanism for operating said conveyors in such timed relation that the brick and pallet reach said point of discharge simultaneously and the brick are discharged upon said pallet.

2. In combination, a platform having a surface including portions arranged in different planes, the edges of the uppermost of said portions forming a substantially vertical wall, and means for propelling articles across the surface of said platform on both the upper and lower planes, said portions being so shaped that the articles may successively pass from the upper to the lower portion and the said edges of the uppermost portion guide the articles on the lower portion to separate said articles from those on the upper portion.

3. In combination a channelway having a substantially plane lower surface, said channelway being adapted to receive a pair of articles having a plurality of substantially flat faces, each of said articles resting on one of said faces on said plane surface, means for propelling said articles through said channelway, and an edging bar in said channelway having a surface inclined to said plane surface and adapted to elevate the adjacent edges of said articles and thereby turn said articles away from each other to rest on a different face, the intersection of said inclined surface and said plane surface being in a line substantially parallel to the leading edges of the articles.

4. In combination, a channelway adapted to receive a pair of articles having a plurality of substantially flat faces, each of said articles resting on one of said faces, means for propelling said articles through said channelway, an edging bar in said channelway adapted to elevate the adjacent edges of said articles and thereby turn said articles to rest on a different face, and a pair of guide members positioned adjacent the entrance to said channelway to center said articles therein and thereby provide sufficient space between the sides of said channelway and said articles for the turning thereof.

5. The combination as defined by claim 4 characterized by said guide members being substantially tetrahedral in form.

6. In combination a channelway adapted to receive an article having a plurality of substantially flat faces, said article resting on one of said faces, means for propelling said article through said channelway, an edging bar in said channelway adapted to elevate one edge of said article for turning the same to rest on another face and a guide member adjacent the entrance of said channelway for guiding said article away from one wall of said channelway to provide sufficient space between said article and said wall for the turning of said article.

7. The combination as defined by claim 6 characterized by said guide member being substantially tetrahedral in form.

8. In combination, a channelway adapted to receive an article having a plurality of substantially flat faces, said article resting on one of said faces, means for propelling said article through said channelway, means in said channelway for turning the article to rest on a different face, and a guide member for guiding said article away from one wall of said channelway previous to the turning operation.

9. The combination as defined by claim 8 characterized by said guide member being substantially tetrahedral in form.

10. In combinaton, a conveyor carrying a pallet having brick thereon, mechanism operable in the movement of said pallet for aligning the brick thereon to leave the front edge of the pallet clear of brick, a separating plate operable in timed relation with the travel of the pallet and adapted to be positioned on the front edge thereof at a predetermined point in its travel, means for moving said brick from the pallet to the separating plate, and means operable thereafter for turning the brick on edge.

11. In combination, a conveyor carrying a pallet having brick thereon, mechanism operable in the movement of said pallet for aligning the brick thereon to leave the front edge of the pallet clear of brick, a separating plate operable in timed relation with the travel of the pallet and adapted to be positioned on the front edge thereof at a predetermined point in its travel, and means for moving said brick from the pallet to the separating plate.

12. In combination a channelway having a substantially plane lower surface, said channelway being adapted to receive an article having a plurality of substantially flat faces, said article resting on one of said faces on said plane surface, means for propelling said article through said channelway, and an edging bar in said channelway having a surface inclined to said plane surface and adapted to elevate one edge of said article and thereby turn said article to rest on a different face, the intersection of said inclined surface and said plane surface being in a line substantially parallel to the leading edge of the article.

13. In combination a channelway adapted to receive a pair of articles having a plurality of substantially flat faces, each of said articles resting on one of said faces, means for propelling said articles through said channelway, and an edging bar in said channelway having an inclined portion adapted to elevate the adjacent edges of said articles and thereby turn said articles away from each other to rest on a different face, said inclined portion of said edging bar having beveled edges, the amount of said bevel being greatest at a point intermediate the ends of said portion.

14. In combination a channelway adapted to receive an article having a plurality of substantially flat faces, said article resting on one of said faces, means for propelling said articles through said channelway, and an edging bar in said channelway having an inclined portion adapted to elevate one edge of said article and thereby turn said article to rest on a diffeernt face, said inclined portion of said edging bar having a beveled edge, the amount of said bevel being greatest at a point intermediate the ends of said portion.

In witness whereof, I have hereunto affixed my signature.

GRAFTON E. LUCE.